United States Patent
Jang et al.

(10) Patent No.: US 9,929,616 B2
(45) Date of Patent: Mar. 27, 2018

(54) MOTOR WITH IMPROVED HOUSING FIXING AND GROUND STRUCTURE

(71) Applicant: NEW MOTECH CO., LTD., Gwangju (KR)

(72) Inventors: Jeong Cheol Jang, Gwangju (KR); Ji Min Lee, Gwangju (KR); Nam Jong Kim, Gwangju (KR)

(73) Assignee: NEW MOTECH CO., LTD., Gwangju (KR)

( * ) Notice: Subject to any disclaimer, the term of this patent is extended or adjusted under 35 U.S.C. 154(b) by 193 days.

(21) Appl. No.: 15/052,878

(22) Filed: Feb. 25, 2016

(65) Prior Publication Data

US 2016/0344250 A1 Nov. 24, 2016

(30) Foreign Application Priority Data

May 22, 2015 (KR) .......................... 10-2015-0071481

(51) Int. Cl.
| | |
|---|---|
| *H02K 5/00* | (2006.01) |
| *H02K 5/08* | (2006.01) |
| *H02K 5/16* | (2006.01) |
| *H02K 5/22* | (2006.01) |

(52) U.S. Cl.
CPC ............. *H02K 5/08* (2013.01); *H02K 5/161* (2013.01); *H02K 5/225* (2013.01); *H02K 2213/12* (2013.01)

(58) Field of Classification Search
CPC ....... H02K 5/08; H02K 2213/12; H02K 5/161
USPC ........................................ 310/43, 88, 89, 91
See application file for complete search history.

(56) References Cited

U.S. PATENT DOCUMENTS

| | | | | |
|---|---|---|---|---|
| 5,049,770 | A * | 9/1991 | Gaeth | F02B 63/06 310/43 |
| 5,872,414 | A * | 2/1999 | Iijima | H02K 5/10 310/43 |
| 6,002,185 | A * | 12/1999 | Nakao | H02K 5/08 264/272.19 |
| 2010/0181873 | A1* | 7/2010 | Kern | B22C 7/026 310/418 |
| 2011/0298311 | A1* | 12/2011 | Sagara | H02K 3/522 310/43 |
| 2013/0043742 | A1* | 2/2013 | Jang | H02K 3/522 310/43 |
| 2013/0181556 | A1* | 7/2013 | Li | H02K 3/522 310/71 |

(Continued)

FOREIGN PATENT DOCUMENTS

| | | |
|---|---|---|
| EP | 2775024 A1 | 9/2014 |
| KR | 10-1462786 B | 11/2014 |

*Primary Examiner* — Hanh Nguyen

(74) *Attorney, Agent, or Firm* — Revolution IP, PLLC

(57) ABSTRACT

The motor according to the present invention is characterized by including a stator core having an upper insulator and a lower insulator combined with an upper portion and a lower portion thereof; a housing manufactured by placing the stator core in an insert injection mold, the housing being formed by a resin molding having at least one upper leg integrally formed in the upper portion thereof; a rotor located inside the stator core of the housing and rotating, the rotor being combined with the housing by having a shaft penetrating into a center portion thereof; and at least one lower leg formed as a separate member from the housing so as to be combined with the lower portion of the housing.

4 Claims, 5 Drawing Sheets

(56) References Cited

U.S. PATENT DOCUMENTS

| | | | | |
|---|---|---|---|---|
| 2015/0123501 A1* | 5/2015 | Jang | ........................ | H02K 5/08 310/43 |
| 2015/0155755 A1* | 6/2015 | Tashiro | .................... | H02K 5/08 310/43 |

* cited by examiner

180
MOTOR WITH IMPROVED HOUSING FIXING AND GROUND STRUCTURE

CROSS REFERENCE TO PRIOR APPLICATIONS

This application claims priority under 35 U.S.C. § 119(a) to Korean Patent Application No. 10-2015-0071481, filed on May 22, 2015, the entire content of which is incorporated herein by reference.

TECHNICAL FIELD

The present invention relates to a motor. More specifically, the present invention relates to a motor with improved structure of fixing a housing of a motor on an installation location of the motor and ground structure.

BACKGROUND ART

In general, brushless direct current (BLDC) motors do not use a brush and a commutator in an ordinary direct current motor, but replace the brush and commutator with an electronic rectification apparatus. These BLDC motors may reduce mechanical or electrical noise, and furthermore, may be controlled at various speeds from a low speed to a high speed. Additionally, the BLDC motors are widely used as driving devices of various electronics such as a refrigerator or an air conditioner, a washing machine, etc.

Among the BLDC motors, there are motors with a leg for fixing a motor on an electronic device such as a washing machine, etc. formed together with the housing. Korean Patent No. 10-1462786 and EP 2775024 disclose a structure for combining a motor housing made of a metallic material such as aluminum, etc. with a tub of the washing machine. In the two prior art references, the motor housing includes an upper housing and a lower housing, and the prior art references disclose a structure of forming a bracket or a leg on the upper housing and the lower housing, respectively, in order to fix the motor on the tub of the washing machine.

However, according to the structure of the two prior art references, since the size of the leg formed in the upper housing and lower housing is fixed, when a fixed location of the motor formed in the tub of the washing machine is changed, the upper and lower housings need to be designed again. Furthermore, since the housing is made of a metallic material, a coil wound in a stator and a metal housing may be disconnected. Also, since the stator is fixed on the housing by being combined with a bolt, etc., noise and vibration may occur when operating the motor.

Accordingly, the present inventor suggests a motor with a new structure in order to solve the above-mentioned problems.

SUMMARY OF INVENTION

It is an object of the present invention to provide a motor which forms a housing of a motor by a resin molding together with a leg for fixing the motor housing, thereby reducing noise or vibration when operating the motor.

It is another object of the present invention to provide a motor which forms a part of the leg of the motor housing as a separate injection molded product and combines it, thereby reducing manufacturing costs of the motor and increasing compatibility since it is possible to newly mold only part of the leg without changing the entire motor housing even if an area of the location where the motor housing is installed is changed.

It is still another object of the present invention to provide a motor which suggests a ground structure suitable for a new housing structure, thereby increasing operation efficiency and durability of the motor.

The above-mentioned objects and other objects inferred from the present invention may be easily achieved by the present invention which will be explained below.

The motor according to the present invention is characterized by including a stator core having an upper insulator and a lower insulator combined with an upper portion and a lower portion thereof; a housing manufactured by placing the stator core in an insert injection mold, the housing being formed by a resin molding having at least one upper leg integrally formed in the upper portion thereof; a rotor located inside the stator core of the housing and rotating, the rotor being combined with the housing by having a shaft penetrating into a center portion thereof; and at least one lower leg formed as a separate member from the housing so as to be combined with the lower portion of the housing.

The present invention may further include a controlling unit formed in the upper portion of the housing, and a first ground member combined with the upper portion of the stator core, and the first ground member may electrically connect the stator core and the controlling unit.

The present invention may further include an upper bearing cover combined with the inner upper portion of a center portion of the housing; an upper bearing indented in the upper bearing cover and rotatably supporting the upper portion of the shaft; a lower bearing rotatably supporting the lower portion of the shaft; and a lower bearing cover having the lower bearing indented and combined therewith, allowing the lower bearing to be combined with the lower portion of the housing.

The present invention may further include a second ground member combined with the lower portion of the stator core, and the second ground member may contact the lower bearing cover to be electrically connected thereto.

Additionally, a bolt penetrating into a leg fixing hole formed in the lower leg may be combined with the lower portion of the stator core.

The present invention has an effect that it provides a motor which forms a housing of a motor by a resin molding together with a leg for fixing the motor housing, thereby reducing noise or vibration when operating the motor. Additionally, the present invention has an effect that it provides a motor which forms a part of the leg of the motor housing as a separate injection molded product and combines it, thereby reducing manufacturing costs of the motor and increasing compatibility since it is possible to newly mold only part of the leg without changing the entire motor housing even if an area of the location where the motor housing is installed is changed. Additionally, the present invention has an effect that it provides a motor which applies a ground structure suitable for a new housing structure, thereby increasing operation efficiency and durability of the motor.

Hereinafter, the present invention will be explained in detail with reference to the drawings attached.

DETAILED DESCRIPTION FOR CARRYING OUT THE INVENTION

Figure 1:
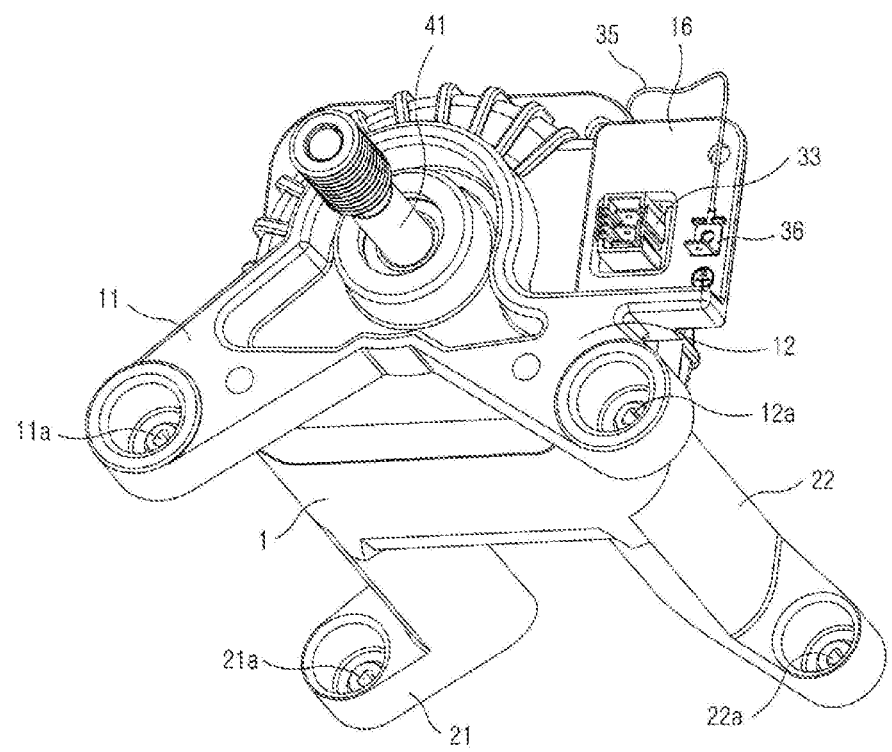
FIG. 1 is a perspective view illustrating a motor according to the present invention.
Figure 2:
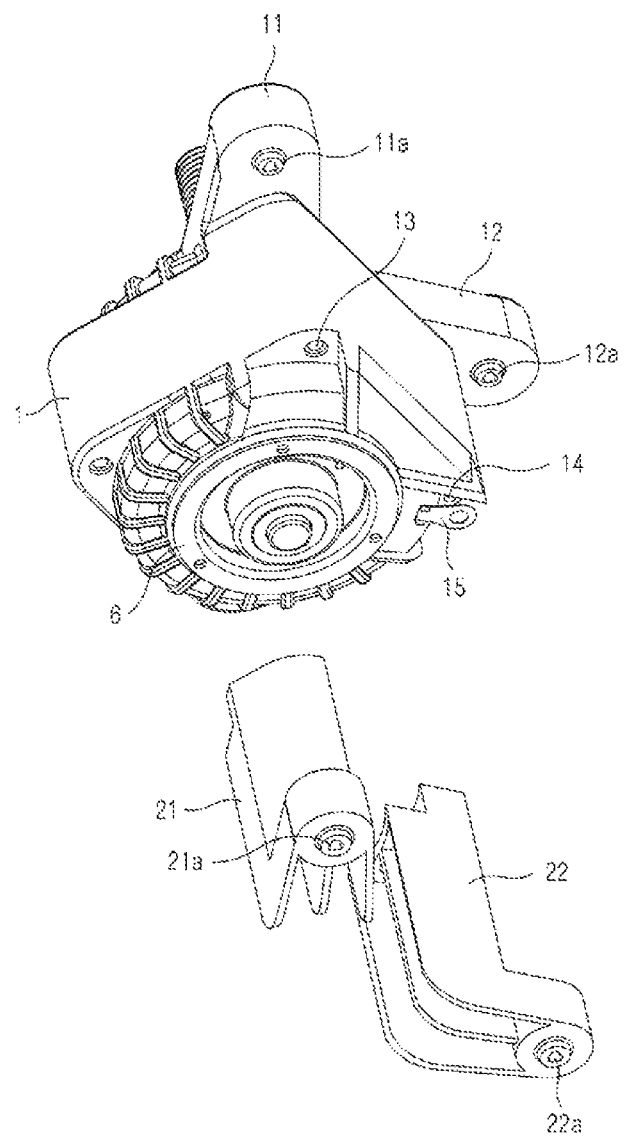
FIG. 2 is an exploded perspective view illustrating a lower leg in the motor of the present invention.

FIG. 1 is a perspective view illustrating a motor according to the present invention, and FIG. 2 is an exploded perspective view illustrating lower legs 21 and 22 in the motor of the present invention.

As illustrated in FIGS. 1 and 2, the motor according to the present invention includes a housing 1 integrally formed with first and second upper legs 11 and 12, and first and second lower legs 21 and 22 each of which being combined with the lower portion of the housing 1.

The housing 1 is made of an insulating resin material, and the housing 1 of the present invention is molded with a resin material and manufactured while placing a stator core (reference numeral 3 in FIG. 3) in an insert injection mold. Preferably, as a resin material, a bulk molding compound (BMC) resin is used. Accordingly, the housing 1 and stator core 3 become one member by resin molding.

A shaft 41 penetrates into a center portion of the housing 1. There is a space inside the housing 1 where a rotor (reference numeral 4 in FIG. 3), which is combined with the shaft 41 and rotates together, is inserted. A lower portion of this space is closed by a lower bearing cover 6. In other words, the shaft 41 penetrates into an upper center portion of the housing 1, there is a space inside and in the lower portion of the housing 1 where a rotor 4 is located to be inserted and rotate, and the lower bearing cover 6 is combined with a lower end of this space.

A controlling unit 16 which includes a printed circuit board (not illustrated) for supplying power to the motor and detecting a rotation speed, etc. of the rotor is located in the upper portion of the housing 1. A power connection insertion unit 33 to be connected to an external power connector (not illustrated) is formed in the controlling unit 16. The controlling unit 16 includes a ground terminal 36, which is included in the external power connector or is connected to a ground circuit formed separately. The ground terminal 36 is electrically connected to one side of a ground line 35, and another side of the ground line 35 is connected to the stator core. The ground structure will be explained in detail in the following.

A first upper leg 11 and a second upper leg 12 are integrally formed in one upper side of the housing 1 with a material of the resin molding. The first upper leg 11 and the second upper leg 12 are combined with a portion where a motor such as a tub, etc. of the washing machine is fixed. To this end, combining holes 11a and 12a are respectively formed at the end portion of one side of the first and second upper legs 11 and 12.

A first lower leg 21 and a second lower leg 22 are separately formed in one lower side of the housing 1 in correspondence to the side where the first upper leg 11 and second upper leg 12 are formed. The housing 1 and the first and second upper legs 11 and 12 are integrally formed with resin molding, but the first lower leg 21 and the second lower leg 22 are formed as separate members and are combined.

A first leg fixing hole 21b is formed in the first lower leg 21, and a second leg fixing hole 22b is formed in the second lower leg 22. A first leg combining hole 13 is formed in the lower portion of the housing 1 in a location corresponding to the first leg fixing hole 21b of the portion where the first lower leg 21 is combined. Likewise, a second leg combining hole 14 is formed in the lower portion of the housing 1 in a location corresponding to the second leg fixing hole 22b of the portion where the second lower leg 22 is combined. A bolt (not illustrated) is combined by penetrating through the first leg fixing hole 21b and the first leg combining hole 13. One end of the bolt is combined with a first core hole (reference numeral 3a in FIG. 5) formed in the stator core 3 by passing through the first leg fixing hole 21b and the first leg combining hole 13. Likewise, the bolt penetrating through the second leg fixing hole 22b and the second leg combining hole 14 is combined with a second core hole (reference numeral 3b in FIG. 5).

It is preferable to manufacture the material of the first and second lower legs 21 and 22 with the same resin molding as the housing 1, but the material is not limited thereto. The first and second lower legs 21 and 22 may be manufactured by an aluminum die-casting, or various materials such as other metals, rubber, reinforced plastics, etc. may be applied as needed. The first and second lower legs 21 and 22 are used when fixing the motor to the tub of the washing machine, etc. Thus, combining holes 21a and 22a are respectively formed at the end portion of one side of the first and second lower legs 21 and 22.

As such, by forming the first and second lower legs 21 and 22 as separate members, there is an advantage that when the size of portion to which the motor is combined and fixed such as the tub of the washing machine, etc. is changed, the specification of the original motor may be applied as it is by simply changing the size of the first and second legs 21 and 22 and combining it to the housing 1 without designing an entire size of the motor again.

When the second lower leg 22 is combined with the lower portion of the housing 1, the lower bearing cover 6 and the stator core 3 are maintained to be equipotential by the second ground member 15. Of course, the second ground member 15 may be combined with the first lower leg 21, not to the second lower leg 22. A detailed structure on this will be explained again with reference to FIG. 5 in the following.

Figure 3:
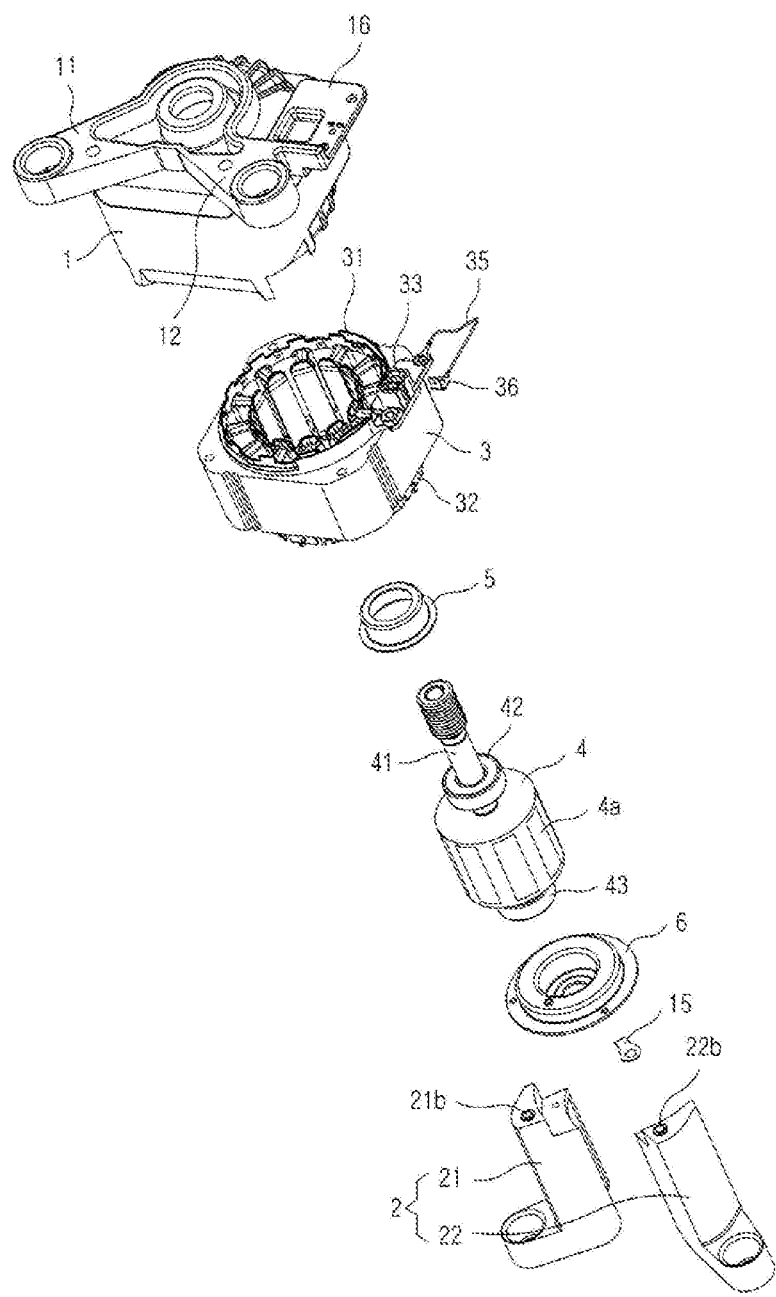
FIG. 3 is an exploded perspective view illustrating the motor according to the present invention.

FIG. 3 is an exploded perspective view illustrating the motor according to the present invention.

Referring to FIG. 3, the motor according to the present invention includes a housing 1, a lower leg 2, a stator core 3, a rotor 4, an upper bearing cover 5 and a lower bearing cover 6.

The housing 1 is made of a resin molding. Although FIG. 3 illustrates the housing 1 and the stator core 3 as separate members, since the housing 1 is manufactured by placing the stator core 3 and members combined therewith in the insert injection mold and then molding them, actually, the housing 1 and the stator core 3 are integrally formed so that they cannot be separated from each other. The first upper leg 11 and the second upper leg 12 are integrally formed in the upper portion of the housing 1 by insert injection molding.

The lower leg 2 includes the first lower leg 21 and the second lower leg 22. The present embodiment explains that the first lower leg 21 and the second lower leg 22 are separate members. However, these two members are not necessarily separate members, and the first lower leg 21 and the second lower leg 22 may be integrally formed as one member. For example, one U-shaped lower leg 2 may be formed and combined with the lower portion of the housing 1.

An upper insulator 31 is combined with the upper portion of the stator core 3, and a lower insulator 32 is combined with the lower portion of the stator core 3. While the upper insulator 31 and lower insulator 32 are combined with the upper portion and lower portion of the stator core 3, a coil (not illustrated) is wound around a plurality of teeth protruded to the inside of the stator core 3. An end of the coil is electrically connected to a power connector insertion unit 33. The first ground member (reference numeral 34 in FIG. 4) is fixed on the upper portion of the stator, and is connected to one side of the ground line 35. Another side of the ground line 35 is electrically connected to the ground terminal 36. FIGS. 1 and 3 illustrate that the ground line 35 is formed protruded to the outside of the housing 1, but this illustration is made to better understand the ground structure, and in fact, preferably the ground line may be located inside the resin molding forming the housing 1 so that it cannot be seen from the outside.

The rotor 4 is located inside the stator core 3 included in the housing and rotates. The rotor 4 includes a plurality of magnets 4a. The rotor 4 rotates with the shaft 41. An upper bearing 42 is combined with the shaft 41 at the upper portion of the rotor 4, and a lower bearing 43 is combined with the shaft 41 at the lower portion of the rotor 4. The upper bearing 42 and lower bearing 43 support the shaft 41 so that the shaft 41 may rotate smoothly.

The upper bearing cover 5, which is a member on which the upper bearing 42 is fixed, is combined with the inside of the upper center portion of the housing 1 and fixed thereto. In order to combine the upper bearing cover 5 with the housing 1, when performing the injection molding on the housing 1 with the resin molding, a shape corresponding to a shape of the upper bearing cover 5 is molded in the upper center portion of the housing 1. It is preferable to apply a metallic material to the upper bearing cover 5 in consideration of strength and durability.

The lower bearing cover 6 closes the lower portion of space where the rotor 4 is inserted into the housing 1 while fixing the lower bearing 43. The inside of the center portion of the lower bearing cover 6 has a shape where the lower bearing 43 may be indented. It is preferable that the lower bearing cover is made of metal in the aspect of strength, etc.

In order to solve problems such as damage to the lower bearing 43 by a leakage current generated by a potential difference between the lower bearing cover 6 and stator core 3, preferably the lower bearing cover 6 maintains an equipotential state, i.e., a ground potential with the stator core 3. To this end, the second ground member 15 electrically connects the lower bearing cover 6 and the stator core 3. The second ground member 15 is combined and electrically connected to a separate bolt (not illustrated) of an electrically conducting material which penetrates into the second leg fixing hole 21b and is combined with the lower portion of the stator core 3. Thus, the stator core 3 and the lower bearing cover 6 could maintain the equipotential state since they are electrically connected to each other by the second ground member 15 and bolt. A hole (not illustrated) for the bolt to be combined may be formed in the lower portion of the stator core 3 in a location corresponding to the second leg fixing hole 22b of the second ground member 22. Meanwhile, the second ground member 15 may be combined with the first leg fixing hole 21b of the first lower leg 21, not to the second lower leg 22.

Figure 4:
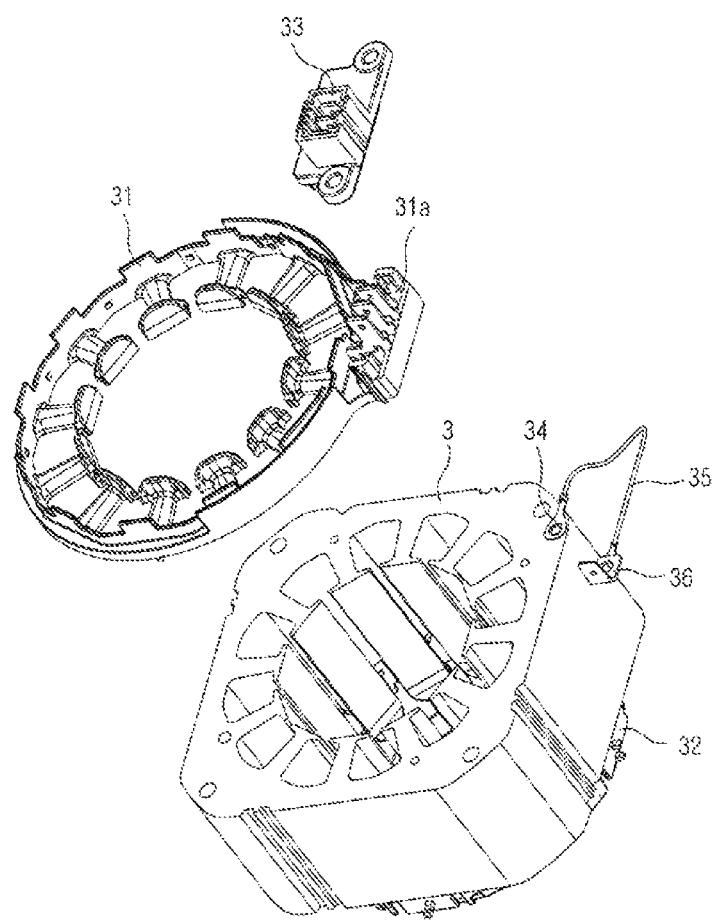
FIG. 4 is an exploded perspective view illustrating a stator core of the motor according to the present invention.

FIG. 4 is an exploded perspective view illustrating the stator core 3 of the motor according to the present invention.

As illustrated in FIG. 4, the upper insulator 31 is combined with the upper portion of the stator core 3 of the motor according to the present invention, and the lower insulator 32 is combined with the lower portion thereof. A power terminal insertion unit 31a is formed integrally or independently in the upper insulator 31. An end of the coil (not illustrated) according to each phase wound around the stator core is connected to the power terminal insertion unit 31a. The power connector insertion unit 33 is combined with the power terminal insertion unit 31a. The power connector insertion unit 33 and the power terminal insertion unit 31a may be separate members, or may be integrally formed as one member.

The first ground member 34 is located in the upper portion of the stator core 3 so that they may be electrically connected to each other. The first ground member 34 is connected to the ground terminal 36 through the ground line 35 and is electrically connected to the ground circuit. A hole corresponding to the hole formed in the center of the first ground member 34 may be formed in the upper portion of the stator core 3, and a bolt (not illustrated) may be inserted into these holes so that they may be electrically connected and combined.

Figure 5:
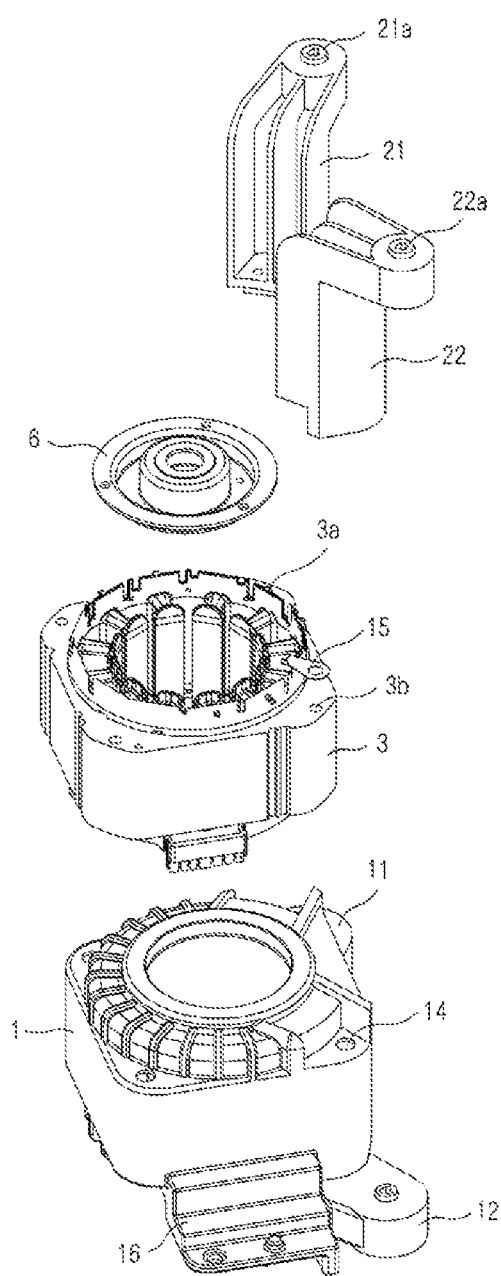
FIG. 5 is an exploded perspective view illustrating the motor according to the present invention observed from the lower portion.

FIG. 5 is an exploded perspective view illustrating the motor according to the present invention observed from the lower portion.

Referring to FIG. 5, in the stator core 3 placed in a location corresponding to the first leg combining hole 13 and second leg combining hole 14 formed in the lower portion of the housing 1, a first core hole 3a and a second core hole 3b are formed, respectively. The second ground member 15 is located in the second core hole 3b, and simultaneously contacts the upper bearing cover 6 so that they are electrically connected. Thus, when the bolt (not illustrated) of a conducting material is combined with the second core hole 3b by passing through the second leg fixing hole 22b and the second leg combining hole 14, the stator core 3 and the lower bearing cover 6 are electrically connected by the second ground member 15 and may be maintained to be equipotential. Of course, as illustrated in FIG. 5, the second ground member 15 may be combined with the second core hole 3b, or may be combined with the first core hole 3a.

The present invention illustrates and explains that the upper legs 11 and 12 and the lower legs 21 and 22 are formed in pairs. However, these legs are not necessarily limited to be in pairs, but at least one leg may be formed according to various structures for fixing the motor.

The detailed description of the present invention explained as above simply explains one or more examples for understanding the present invention, but does not intend to limit the scope of the present invention. The scope of the present invention is determined by the claims attached. Additionally, it should be construed that a simple modification or change falls under the protection scope of the present invention.

What is claimed is:

1. A motor, comprising:
   a stator core having an upper insulator and a lower insulator combined with an upper portion and a lower portion of the stator core;
   a housing manufactured by placing the stator core in an insert injection mold, the housing being formed by a resin molding having at least one upper leg integrally formed in an upper portion of the housing;

a rotor located inside the stator core of the housing and rotating, the rotor being combined with the housing by having a shaft penetrating into a center portion of the rotor; and at least one lower leg formed as a separate member from the housing so as to be combined with a lower portion of the housing.

2. The motor of claim 1, further comprising:

a controlling unit formed in the upper portion of the housing; and a first ground member combined with the upper portion of the stator core, wherein the first ground member electrically connects the stator core and the controlling unit.

3. The motor of claim 1, further comprising:

an upper bearing cover combined with an inner upper portion of a center portion of the housing;

an upper bearing indented in the upper bearing cover and rotatably supporting an upper portion of the shaft;

a lower bearing rotatably supporting a lower portion of the shaft; and a lower bearing cover having the lower bearing indented and combined therewith, allowing the lower bearing to be combined with the lower portion of the housing.

4. The motor of claim 3, further comprising a second ground member combined with the lower portion of the stator core, wherein the second ground member contacts the lower bearing cover to be electrically connected thereto, and a bolt penetrating into a leg fixing hole formed in the lower leg is combined with the lower portion of the stator core.

* * * * *